(12) United States Patent
Nakamura

(10) Patent No.: US 9,206,048 B2
(45) Date of Patent: *Dec. 8, 2015

(54) ELECTROCONDUCTIVE POLYAMIDE RESIN COMPOSITION

(75) Inventor: Ken Nakamura, Ube (JP)

(73) Assignee: Ube Industries, Ltd., Yamaguchi (JP)

( * ) Notice: Subject to any disclaimer, the term of this patent is extended or adjusted under 35 U.S.C. 154(b) by 674 days.

This patent is subject to a terminal disclaimer.

(21) Appl. No.: 13/389,015

(22) PCT Filed: Aug. 5, 2010

(86) PCT No.: PCT/JP2010/063331
§ 371 (c)(1),
(2), (4) Date: Feb. 6, 2012

(87) PCT Pub. No.: WO2011/016535
PCT Pub. Date: Feb. 10, 2011

(65) Prior Publication Data
US 2012/0132865 A1 May 31, 2012

(30) Foreign Application Priority Data
Aug. 7, 2009 (JP) ................. 2009-183961

(51) Int. Cl.
*H01B 1/24* (2006.01)
*C08G 69/26* (2006.01)
*C08K 7/04* (2006.01)
*C08L 77/06* (2006.01)
*C01B 31/02* (2006.01)
*B82Y 30/00* (2011.01)
*B82Y 40/00* (2011.01)
*D01F 9/127* (2006.01)

(52) U.S. Cl.
CPC ............. *C01B 31/022* (2013.01); *B82Y 30/00* (2013.01); *B82Y 40/00* (2013.01); *C01B 31/0226* (2013.01); *C01B 31/0273* (2013.01); *C08L 77/06* (2013.01); *D01F 9/127* (2013.01); *C08K 7/04* (2013.01); *C08L 2203/20* (2013.01)

(58) Field of Classification Search
CPC .................................... H01B 1/02; H01B 1/24
USPC .................................. 252/500–511; 977/753
See application file for complete search history.

(56) References Cited

U.S. PATENT DOCUMENTS 5,643,990 A   7/1997   Uehara et al.
7,026,432 B2  4/2006   Charati et al.
(Continued)

FOREIGN PATENT DOCUMENTS

EP   1 300 364 A2   4/2003
EP   1 637 563 A1   3/2006
(Continued)

OTHER PUBLICATIONS

Okuno et al. ("Synthesis of carbon nanotubes and nano-necklaces by thermal plasma process." Carbon, 42, pp. 2543-2549, online Jul. 2, 2004).*
(Continued)

*Primary Examiner* — Tri V Nguyen
(74) *Attorney, Agent, or Firm* — Nixon Peabody LLP; Jeffrey L. Costellia

(57) ABSTRACT

There is provided an electroconductive polyamide resin composition comprising: (a) a polyamide resin component obtained from a dicarboxylic acid component comprising oxalic acid and a diamine component comprising a diamine having 4 to 12 carbon atoms, and (b) a fine carbon fiber dispersed in the resin component, wherein a graphite-net plane consisting solely of carbon atoms forms a temple-bell-shaped structural unit comprising closed head-top part and body-part with open lower-end, 2 to 30 of the temple-bell-shaped structural units are stacked sharing a common central axis to form an aggregate, and the aggregates are connected in head-to-tail style with a distance to form the fiber.

5 Claims, 4 Drawing Sheets

(56) References Cited

U.S. PATENT DOCUMENTS

| | | | |
|---|---|---|---|
| 2002/0019497 A1* | 2/2002 | Mawatari et al. | 525/418 |
| 2003/0044615 A1 | 3/2003 | Yanagisawa et al. | |
| 2003/0086859 A1 | 5/2003 | Kawakami et al. | |
| 2004/0005269 A1 | 1/2004 | Huang et al. | |
| 2004/0181005 A1* | 9/2004 | Warth et al. | 524/495 |
| 2004/0258606 A1 | 12/2004 | Yamamoto et al. | |
| 2005/0038203 A1* | 2/2005 | Elkovitch et al. | 525/397 |
| 2006/0239897 A1 | 10/2006 | Moy et al. | |
| 2006/0281860 A1* | 12/2006 | Higuchi et al. | 525/89 |
| 2007/0148389 A1 | 6/2007 | Nishioka et al. | |
| 2008/0191176 A1* | 8/2008 | Tobori et al. | 252/511 |
| 2009/0035569 A1 | 2/2009 | Gonzalez Moral et al. | |
| 2009/0275682 A1* | 11/2009 | Furukawa et al. | 524/126 |
| 2010/0098893 A1* | 4/2010 | Okushita et al. | 428/36.9 |
| 2010/0113259 A1 | 5/2010 | Ma et al. | |
| 2010/0119949 A1 | 5/2010 | Yano et al. | |
| 2011/0003151 A1 | 1/2011 | Nishio et al. | |

FOREIGN PATENT DOCUMENTS

| | | |
|---|---|---|
| EP | 2 096 133 A1 | 9/2009 |
| EP | 2 131 422 A1 | 12/2009 |
| EP | 2 251 465 A1 | 11/2010 |
| JP | H01-131251 | 5/1989 |
| JP | H02-235945 | 9/1990 |
| JP | H03-74465 | 3/1991 |
| JP | H07-207154 | 8/1995 |
| JP | 08-025578 | 1/1996 |
| JP | 2001-310994 | 11/2001 |
| JP | 2003-206117 | 7/2003 |
| JP | 2003-221217 | 8/2003 |
| JP | 2003-227039 | 8/2003 |
| JP | 2004-230926 | 8/2004 |
| JP | 2004-231745 | 8/2004 |
| JP | 2004-238791 | 8/2004 |
| JP | 2004-299986 | 10/2004 |
| JP | 2004-303613 | 10/2004 |
| JP | 2004-323738 | 11/2004 |
| JP | 2005-512925 | 5/2005 |
| JP | 2006-057033 | 3/2006 |
| JP | 2006-103996 | 4/2006 |
| JP | 2006-306960 | 11/2006 |
| JP | 2007-169561 | 7/2007 |
| JP | 2007-231219 | 9/2007 |
| JP | 2008-230947 | 10/2008 |
| JP | 2008-270204 | 11/2008 |
| JP | 2008-277128 | 11/2008 |
| JP | 2009-272041 | 11/2009 |
| JP | 2010-031214 | 2/2010 |
| WO | WO 87/07559 | 12/1987 |
| WO | WO 90/10296 | 9/1990 |
| WO | WO 02/095097 A1 | 11/2002 |
| WO | WO 03/050333 A1 | 6/2003 |
| WO | WO 2008/072754 A1 | 6/2008 |
| WO | WO 2009/110570 A1 | 9/2009 |
| WO | WO 2010/114089 A1 | 10/2010 |

OTHER PUBLICATIONS

U.S. Office Action dated Dec. 7, 2012 issued in U.S. Appl. No. 12/920,769.

Supplementary European Search Report dated Jul. 6, 2012 issued in European Patent Application No. 10758860.0 by European Patent Office.

Supplementary European Search Report dated Jun. 7, 2012 issued in European Patent Application No. 10758860.0 by European Patent Office.

International Preliminary Report on Patentability (Chapter I) dated Mar. 22, 2012 and Written Opinion dated Nov. 16, 2010 in International Application No. PCT/JP2010/063331.

Final Office Action dated Jun. 21, 2013 issued in a U.S. Appl. No. 12/920,769.

Extended European Search Report dated May 24, 2013 issued in an European Pat. App. No. 09 71 6952.8.

Y.A. Kim et al., "Effect of ball milling on morphology of cup-stacked carbon nanotubes"; Chemical Physics Letters, vol. 355, Apr. 2, 2002, pp. 279-284.

J.M. Feng et al., "Controlled growth of high quality bamboo carbon nanotube arrays by the double injection chemical vapor deposition process"; Materials Science & Engineering A, vol. 473, (2008), pp. 238-243.

L.Y. Heng et al., "Demonstration of the advantages of using bamboo-like nanotubes for electrochemical biosensor applications compared with single walled carbon nanotubes"; Electrochemistry Communications, vol. 7, (2005), pp. 1457-1462.

Y. Lu et al., "Formation of bamboo-shape carbon nanotubes by controlled rapid decomposition of picric acid"; Carbon, vol. 42, (2004), pp. 3199-3207.

E. Flahaut et al., "CCVD synthesis of carbon nanotubes from (Mg,Co, Mo)O catalysts: influence of the proportions of cobalt and molybdenum"; Journal of Materials Chemistry, vol. 14, (2004), pp. 646-653.

Third Party Observation filed on Jan. 17, 2012 in a European Patent Application No. EP 09716952.8.

International Preliminary Report on Patentability (Chapter I) dated Mar. 22, 2012 and Written Opinion dated Nov. 11, 2010 in International Application No. PCT/JP2010/063331.

International Search Report in International Application No. PCT/JP2010/063331.

Endo, "Basic of Carbon Nanotube and Frontier of Industrialization of Carbon Nanotube," Jan. 11, 2002, pp. 246-249.

Audier, "Morphology and Crystalline Order in Catalytic Carbons," Carbon, 1981, vol. 19, pp. 217-224.

Inagaki (editor), "Commentary on Carbon Family," Oct. 30, 2001, pp. 90-91.

Katayama, "Inorganic Material Science for Engineering," Apr. 10, 2006, p. 29.

Experimental Chemistry Course 28, "Chemistry of Nanotechnology," 5th edition, Chemical Society of Japan, Jul. 30, 2005, p. 34.

"Experimental Technology on Latest Carbon Materials (Book on Analysis)," Carbon Society of Japan, Nov. 30, 2001, p. 157.

Non-Final Office Action dated May 8, 2014 issued in a U.S. Appl. No. 13/381,118.

M. Lin et al., "Dynamical Observation of Bamboo-like Carbon Nanotube Growth", Nano Letters, Jun. 30, 2007, vol. 7, No. 8, pp. 2234-2238.

J.P. Pinheiro, et al., Nanotubes and nanofilaments from carbon monoxide disproportionation over Co/Mg0 catalysts 1. Growth versus catalyst state; Carbon 41 (2003), pp. 2949-2959.

N. Pierard. et al., "Production of short carbon nanotubes with open tips by ball milling"; Chemical Physics Letters, 335 (2001), pp. 1-8.

E. Flahaut, et al., "Gram-scale CCVD synthesis of double-walled carbon nanotubes"; ChemComm, 2003, pp. 1442-1443.

Extended European Search Report issued Jan. 5, 2015 in an European Patent Application No. 10806535.0.

U.S. Office Action (U.S. Appl. No. 14/338,129) dated Jan. 16, 2015.

Extended European Search Report issued Jan. 7, 2015 in an European Patent Application No. 10806535.0.

U.S. Office Action (U.S. Appl. No. 13/260,673) Dated Apr. 1, 2015.

Wei C et al., "Nanomechanics of Carbon Nanofibers: Structural and Elastic Properties", May 26, 2004, pp. 1-8, NASA Ames Research Center.

Non-Final U.S. Office Action mailed May 21, 2015 issued in the U.S. Appl. No. 13/262,150.

\* cited by examiner (a)　　　(b)

ELECTROCONDUCTIVE POLYAMIDE RESIN COMPOSITION

TECHNICAL FIELD

The present invention relates to a novel electroconductive polyamide resin composition. For details, the present invention relates to an electroconductive polyamide resin composition, wherein are mixed a polyamide resin produced from a dicarboxylic acid component comprising oxalic acid and a diamine component, which is excellent in a molding processability and also excellent in a mechanical physical property, a low water absorbability, a chemical resistance and a hydrolysis resistance, and a fine carbon fiber and/or a fine short carbon fiber as an agent imparting electroconductivity.

BACKGROUND ART

It is well known that an electroconductive filler is kneaded and dispersed into an electrically insulative resin, which turns into an electroconductive resin in order to impart electroconductivity for antistatic and other purposes. As an electroconductive filler to be kneaded into a resin, an ionic electroconductive organic surfactant, a metal fiber and powder, an electroconductive metal oxide powder, a carbon black, a carbon fiber, a graphite powder and the like are generally utilized. By molding and processing an electroconductive resin composition wherein this filler has been molten, kneaded and dispersed into a resin, a molded article having a volume resistance value of $10^{-1}$ to $10^{12}$ $\Omega \cdot cm$ can be obtained.

However, a metallic filler has the problem of a poor corrosion resistance and chemical resistance. An inorganic electroconductive filler requires a large amount of blending more than 50% by mass relative to the total mass of a composition because it is generally granular. Thus, its resin properties degrade and molding becomes difficult. Blending with a carbon black in 15% by mass or less allows for a high electroconductivity because the Ketjen Black (the registered trademark by the Ketjen Black International Co.) and an acetylene black are available, which form an electroconductive circuit with a chain-like structure. However, these are difficult to the control of dispersion into a resin and a distinct formulation and mixing technologies are required to obtain a stable electroconductivity. Even if a sufficient electroconductivity is obtained, not only a processability extremely degrades but also the physical properties of an electroconductive resin composition such as a tensile strength, a flexural strength and an impact resistance strength extremely degrade in comparison with the original physical properties of a resin free from an electroconductive filler.

In terms of an electroconductive filler, a relatively small amount of blending can also impart an electroconductivity to a resin by using a material with a high aspect ratio (length/outside diameter) in a flake form, a whisker form or a fibrous form. This is because an electroconductive filler with the higher aspect ratio forms the more effective linkage between fillers in the same amount of blending, which allows for obtaining an electroconductivity in the smaller amount.

However, even the electroconductive filler with a high aspect ratio described above such as a graphite powder in a flake form and a carbon fiber in a whisker form requires a mount more than 15% by mass to exhibit an electroconductivity, which degrades the original properties of a resin. Upon obtaining a molded article with a complex shape, a moldability and electroconductivity is inhibited with the emergence of deviation and orientation of fibers. There is also the problem such as an environmental pollution and damages on a device during the process of a semiconductor device because the carbon particles and carbon fibers readily slough away from the surface of a molded article (sloughy).

When the carbon fibers with different fiber diameters are also blended in the same amount of mass, the fiber with the smaller fiber diameter is more excellent in imparting an electroconductivity due to the more facile formation of an electroconductive circuit network among fibers. A hollow extrafine carbon fiber, the so-called carbon nanotube has been recently disclosed, which has a fiber diameter smaller in two to three digits than that of conventional carbon fibers, and its blending into various resins, rubbers and the like has been also proposed as an electroconductive filler (Patent document 1: JP-A-H01-131251, Patent document 2: JP-A-H03-74465, Patent document 3: JP-A-H02-235945), which is regarded as an effective electroconductive filler solving the defects of the conventional electroconductive fillers.

So-called ultrafine carbon fibers collectively called as carbon nanofiber or carbon nanotube can be generally categorized into the following three nanostructured carbon materials based on their shapes, configurations and structures:

(1) Multilayer carbon nanotube (multilayer concentric cylindrical graphite layer)(non-fishbone type);
Japanese publication of examined application Nos. H03-64606 and H03-77288
Japanese Laid-Open publication No. 2004-299986
(2) Cup stack type carbon nanotube (fishbone type);
U.S. Pat. No. 4,855,091
M. Endo, Y. A. Kim etc.: Appl. Phys. Lett., vol 80 (2002) 1267 et seq.
Japanese Laid-Open publication No. 2003-073928
Japanese Laid-Open publication No. 2004-360099
(3) Platelet type carbon nanofiber (card type)
H. Murayama, T. maeda: Nature, vol 345 [No. 28] (1990) 791 to 793
Japanese Laid-Open publication No. 2004-300631.

In a (1) multilayer carbon nanotube, conductivity in a longitudinal direction of the carbon nanotube is high because electron flow in a graphite network plane (C-axis) direction contributes to conductivity in a longitudinal direction. On the other hand, for inter-carbon-nanotube conductivity, electron flow is perpendicular to a graphite network plane (C-axis) direction and is generated by direct contact between fibers, but it is believed that within a resin, since inter-fiber contact is not so contributive, electron flow by electrons emitted from the surface layer of a conductive filler plays more important role than electron flow in fibers. Ease of electron emission involves conductivity performance of a filler. It is supposed that in a carbon nanotube, a graphite network plane is cylindrically closed and jumping effect (tunnel effect hypothesis) by π-electron emission little occurs.

In an ultrafine carbon fiber having a (2) fishbone or (3) card type structure, an open end of a graphite network plane is exposed in a side peripheral surface, so that conductivity between adjacent fibers is improved in comparison with a carbon nanotube. However, since the fiber has a piling structure in which C-axis of a graphite network plane is inclined or orthogonal to a fiber axis, conductivity in a longitudinal fiber-axis direction in a single fiber is reduced, resulting in reduced conductivity as the whole composition.

The so-called carbon nanotubes described above have also difficulty in uniform dispersion into a resin, and they are far from satisfactory because there are problems such as unspinnability (broken thread), filter occlusion at the discharge part of a molding machine, deterioration in the mechanical strengths such as the impact resistance of a molded article and its surface appearance due to the residue of the undispersed portion of carbon nanotubes as an aggregate in a resin. For this reason, blending and mixing the especial compositions and the particular surface modification treatments are needed, for example, optimization of resin molecular weight (Patent document 4: JP-A-2001-310994), blending with modified resin, elastomer and compatibilizing agent (Patent document 5: JP-A-2007-231219, Patent document 6: JP-A-2004-230926, Patent document 7: JP-A-2007-169561, Patent document 8: JP-A-2004-231745) and surface modification treatment of carbon nanotube (Patent document 9: JP-A-2004-323738), and the kind, composition and the like of resins are restricted, thus, further improvements are demanded.

On the other hand in terms of a resin, crystalline polyamides as typified by nylon 6 and nylon 66 are widely employed as a textile for clothing and for industrial materials or a versatile engineering plastic due to their excellent properties and easiness of melt molding; however, problems are clarified such as a property deviation by absorbing water and a degradation in acids, alcohols at an elevated temperature and hot water.

Although there is also a demand for an electroconductivity in an application employing a polyamide resin for purpose such as antistatic and electromagnetic shielding (for example, Patent document 11: JP-A-H07-207154), a problem is pointed out in decrease in an electroconductivity owing to swelling upon absorbing moisture, a hydrocarbon fuel and an alcohol in case of the conventional aliphatic polyamide resins.

However, it is known that a polyamide resin produced by employing oxalic acid as a dicarboxylic acid component, referred to as a polyoxamide resin, has a higher melting point and a lower percentage of water absorption in comparison with other polyamide resins with the same concentration of a amino group (Patent document 10: JP-A-2006-57033), which is expected to be utilized in the field where it is difficult to use the conventional polyamides due to the problem of a property deviation by absorbing water.

PATENT DOCUMENTS

Patent document 1: JP-A-H01-131251
Patent document 2: JP-A-H03-74465
Patent document 3: JP-A-H02-235945
Patent document 4: JP-A-2001-310994
Patent document 5: JP-A-2007-231219
Patent document 6: JP-A-2004-230926
Patent document 7: JP-A-2007-169561
Patent document 8: JP-A-2004-231745
Patent document 9: JP-A-2004-323738
Patent document 10: JP-A-2006-57033
Patent document 11: JP-A-H07-207154

SUMMARY OF INVENTION

Problem to be Solved by the Invention

The objective of the present invention is to provide an electroconductive polyamide resin, which achieves a sufficient heightening of molecular-weight and has a lower water absorbability and an excellent chemical resistance and an excellent hydrolysis resistance in comparison with the conventional aliphatic polyamide resins. The objective is further to provide a polyamide resin composition, which achieves the mixing and dispersion of a fine carbon fiber into a resin and has a high electroconductivity while upholding the original property of a resin, even without employing the especial kneading and mixing procedures and blending formulations.

Means for Solving Problem

The present invention relates to the following terms.
1. An electroconductive polyamide resin composition comprising:
   (a) a polyamide resin component obtained from a dicarboxylic acid component comprising oxalic acid and a diamine component comprising a diamine having 4 to 12 carbon atoms, and
   (b) a fine carbon fiber dispersed in the resin component, wherein a graphite-net plane consisting solely of carbon atoms forms a temple-bell-shaped structural unit comprising closed head-top part and body-part with open lower-end, 2 to 30 of the temple-bell-shaped structural units are stacked sharing a common central axis to form an aggregate, and the aggregates are connected in head-to-tail style with a distance to form the fiber.
2. The electroconductive polyamide resin composition according to the above item 1, wherein the fine carbon fiber is produced by vapor phase growth using a catalyst containing an element selected from the group consisting of Fe, Co, Ni, Al, Mg and Si, and an ash content in the fine carbon fiber is 4% by mass or less.
3. The electroconductive polyamide resin composition according to the above item 1 or 2, wherein the fine carbon fiber is a fine short carbon fiber in which 100 or less of the aggregates are connected.
4. The electroconductive polyamide resin composition according to the above item 3, wherein the fine short carbon fibers are produced by fiber shortening by applying shear stress.
5. An electroconductive polyamide resin composition according to any one of the above items 1 to 4, wherein the diamine component of the polyamide resin is consisting of 1,9-nonanediamine and 2-methyl-1,8-octanediamine, and wherein a molar ratio of 1,9-nonanediamine and 2-methyl-1,8-octanediamine is 1:99 to 99:1.

Effect of the Invention

In accordance with the present invention, a polyamide resin composition is provided which has a high moldability and electroconductivity while upholding the original property of a polyamide resin. In the electroconductive polyamide resin composition of the present invention, the addition of a small amount of a fine carbon fiber and/or a fine short carbon fiber achieves a high electroconductivity. For this reason, the electroconductive resin composition is obtained without a large deterioration in the original property of a resin such as, for example, its moldability. Furthermore, the electroconductivity of the electroconductive polyamide resin composition of the present invention does not decrease upon absorbing water and upon absorbing a fuel and solvent.

MODE FOR CARRYING OUT THE INVENTION

Figure 1:
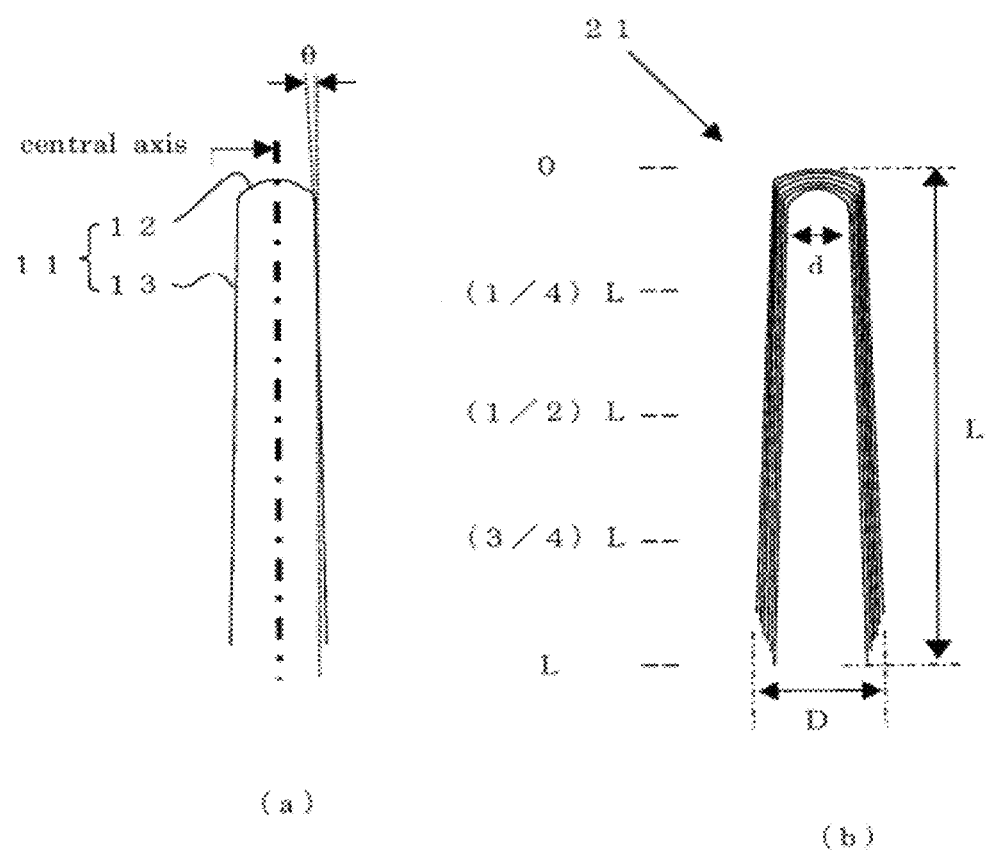
FIG. 1(a) is a drawing schematically showing a minimal structural unit (temple-bell-shaped structural unit) constituting a fine carbon fiber.
FIG. 1(b) is a drawing schematically showing an aggregate consisting of 2 to 30 stacked temple-bell-shaped structural units.
Figure 2:
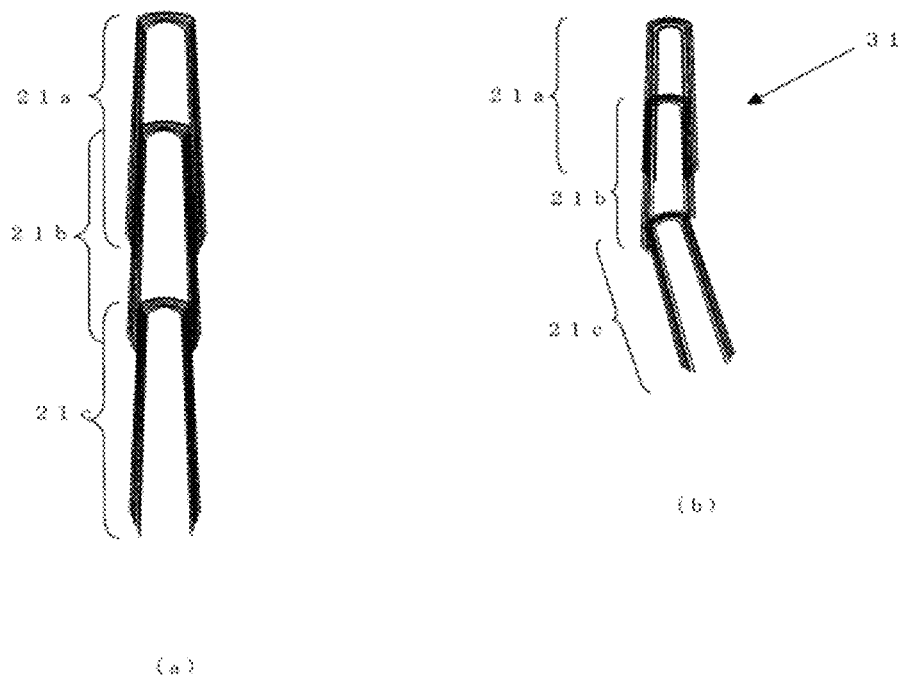
FIG. 2(a) is a drawing schematically showing connecting aggregates with a certain distance to form a fiber.
FIG. 2(b) is a drawing schematically showing curved connection when aggregates are connected with a certain distance.

Hereafter, the present invention is explained in details. In the present invention, the concept of "fine short carbon fiber" is encompassed by the "fine carbon fiber" and means a short fiber with a short fiber length among the "fine carbon fibers" as mentioned later. In the following explanations, the "fine carbon fiber" generally means the "fine carbon fiber" wherein the fibers are not shortened. The "fine carbon fiber" and "fine short carbon fiber" also mean the carbon fiber with the specific structure as explained below unless explicitly indicated, and they do not mean the carbon fibers with the known structures.

<<Electroconductive Polyamide Resin Composition>>

In terms of the electroconductive polyamide resin composition of the present invention, the fine carbon fiber (encompassing the fine short carbon fiber) is dispersed in the polyamide resin component. Detailed explanations are given later for the fine carbon fiber and the polyamide resin component to be employed for the present invention, and the dicarboxylic acid component and the diamine component to be employed for producing the polyamide resin component, and the like.

In the present invention, the blending amount of the fine carbon fiber in the polyamide resin component can be varied in a wide range compared with the "conventional ultrafine carbon fibers" due to the excellent dispersibility of the fine carbon fiber (encompassing the fine short carbon fiber). Although the blending amount of the fine carbon fiber may arbitrarily be altered within a range which allows for an intended electroconductivity and within a range which does not cause a degradation of a moldability and a degradation of mechanical properties of a molded article, the amount is 0.1 to 40% by mass, more preferably 0.5 to 20% by mass and further preferably 1 to 15% by mass relative to the total mass of the composition.

By blending the fine carbon fiber into the polyamide resin, the electroconductive polyamide resin composition of the present invention has its advantages in the following respective applications. In an application of molding process, a processability is improved, and a deformation and shrinkage are suppressed. In electrical and electronic applications, an electrostatic charge is prevented and imparting of an electroconductivity and shielding of an electromagnetic wave are exhibited. In an application of reinforcement, an elastic modulus, a stiffness, a tensile strength and an impact resistance are improved. In a thermal application, a low distensibility, a thermal conductivity and a thermal resistance are improved. In acoustic and vibrational applications, a vibration damping and properties of an oscillator such as a speaker are improved. In a tribological application, an abrasion resistance, a slidability and a performance for the prevention of powder dropping are improved. In an application of flame resistance, an effect on the prevention of dripping can be imparted.

<Method for Producing the Electroconductive Polyamide Resin Composition>

The electroconductive polyamide resin composition of the present invention is prepared by the known mixing method to mix (a) the polyamide resin component, (b) the fine carbon fiber (encompassing the fine short carbon fiber) and optionally resin other than polyamide and an additional component as mentioned later. Since in particular, the fine carbon fiber (encompassing the fine short carbon fiber) is excellent in a dispersibility, the composition can be produced by the known method of kneading and kneading machines.

For example, after adding the fine carbon fiber and an additional component as necessary to the polyamide resin, the production can be carried out by dispersing them into the polyamide resin in a state of melting or softening by employing a roll mill, a melt blender (the Banbury mixer, the Brabender, the Ko-kneader), a single or double screw extruding kneader. The provision method of the fine carbon fiber and the additional component may be done collectively or in multiple steps.

Upon kneading each component, since there is an open end being an active site in the fine carbon fiber as mentioned later, it is inferred that its affinity with a resin is high and that the dispersibility upon kneading is improved, which at the same time contributes to the retention and improvement of physical properties of a resin.

As mentioned later in the fine carbon fiber, the linking part of the aggregate of the temple-bell-shaped structural units, which are bonded by a weak force of the van der Waals force, also readily dissociates at its bonding part by a shear force upon kneading. Generally, the catalytic vapor phase growth method, which currently shows the most promise as a procedure conducting mass productions, generates an agglomerate (a fuzzball from several micrometers to 1 mm) wherein a long filamentous fibers not less than 1 μm intricately intertangle. Since however, the fine carbon fiber to be used in the present invention is cleaved into an appropriate length by adjusting the shear force to progress the shortening and opening of fibers in the fiber aggregate, the electroconductive resin composition can be obtained without using the especial dispersion technologies and dispersion equipments.

The fine short carbon fiber has more excellent dispersibility because the fiber is shortened by ablation of the fiber at bonding parts as mentioned later.

Fine Carbon Fiber and Fine Short Carbon Fiber

The following description summarizes typical features and typical production processes for a fine carbon fiber or fine short carbon fiber contained in a composition of the present invention.

1. A fine carbon fiber preferably produced by vapor growth, wherein a graphite-net plane consisting solely of carbon atoms forms a temple-bell-shaped structural unit comprising closed head-top part and body-part with open lower-end, where an angle θ formed by a generatrix of the body-part and a fiber axis is less than 15°, 2 to 30 of the temple-bell-shaped structural units are stacked sharing a common central axis to form an aggregate, and the aggregates are connected in head-to-tail style with a distance to form the fiber.

2. The fine carbon fiber according to the above item 1, wherein an end of the body-part of the aggregate has an outer diameter D of 5 to 40 nm and an inner diameter d of 3 to 30 nm, and an aspect ratio (L/D) of the aggregate is 2 to 30.

3. The fine carbon fiber according to the above item 1 or 2, wherein an ash content is 4% by weight or less.

4. The fine carbon fiber according to any one of the above items 1 to 3, wherein a peak half width W (unit: degree) of 002 plane in the fine carbon fiber is 2 to 4 as determined by X-ray diffractometry.

5. The fine carbon fiber according to any one of the above items 1 to 4, wherein a graphite plane gap (d002) of the fine carbon fiber is 0.341 to 0.345 nm as determined by X-ray diffractometry.

6. A process for manufacturing a fine carbon fiber comprising feeding a mixed gas containing CO and $H_2$ onto a catalyst containing an element selected from the group consisting of Fe, Co, Ni, Al, Mg and Si, to initiate a reaction and growing the fine carbon fiber; wherein the catalyst preferably comprises a spinel-type oxide of cobalt, in which magnesium is contained by substitution forming solid solution.

7. The process for manufacturing a fine carbon fiber according to the above item 6, wherein when the spinel-type oxide is represented by $Mg_xCo_{3-x}O_y$, "x" which is a solid solution range of magnesium is 0.5 to 1.5.

8. The process for manufacturing a fine carbon fiber according to the above item 6 or 7, wherein in the spinel-type oxide, a crystal lattice constant "a" (cubic system) is 0.811 to 0.818 nm as determined by X-ray diffraction measurement.

9. The process for manufacturing a fine carbon fiber according to any one of the above items 6 to 8, wherein a volume ratio of $CO/H_2$ in the mixed gas is within the range of 70/30 to 99.9/0.1 and a reaction temperature is within the range of 400 to 650° C.

10. A fine short carbon fiber prepared by shortening a fine carbon fiber preferably produced by vapor growth, wherein a graphite-net plane forms a temple-bell-shaped structural unit comprising closed head-top part and body-part with open lower-end, 2 to 30 of the temple-bell-shaped structural units are stacked sharing a central axis to form an aggregate, and one to several tens of the aggregates are connected in head-to-tail style.

11. The fine short carbon fiber according to the above item 10, wherein the generatrix of the body-part and the fiber axis form an angle θ of less than 15°.

12. The fine short carbon fiber according to the above item 10 or 11, wherein an end of the body-part of the aggregate has an outer diameter D of 5 to 40 nm and an inner diameter d of 3 to 30 nm, and an aspect ratio (L/D) of the aggregate is 2 to 30.

13. The fine short carbon fiber according to any one of the above items 10 to 12, wherein an ash content is 4% by weight or less.

14. The fine short carbon fiber according to any one of the above items 10 to 13, wherein a peak half width W (unit: degree) of 002 plane in the fine carbon fiber is 2 to 4 as determined by X-ray diffractometry.

15. The fine short carbon fiber according to any one of the above items 10 to 14, wherein a graphite plane gap (d002) of the fine carbon fiber is 0.341 to 0.345 nm as determined by X-ray diffractometry.

16. A fine short carbon fiber produced by shortening the carbon fiber according to any one of the above items 1 to 5 by applying shear stress.

17. A process for manufacturing a fine short carbon fiber, comprising preparing a fine carbon fiber by the manufacturing process according to any one of the above items 6 to 9 and then applying shear stress to the fiber for shortening.

There will be described the above items in details

Figure 3:
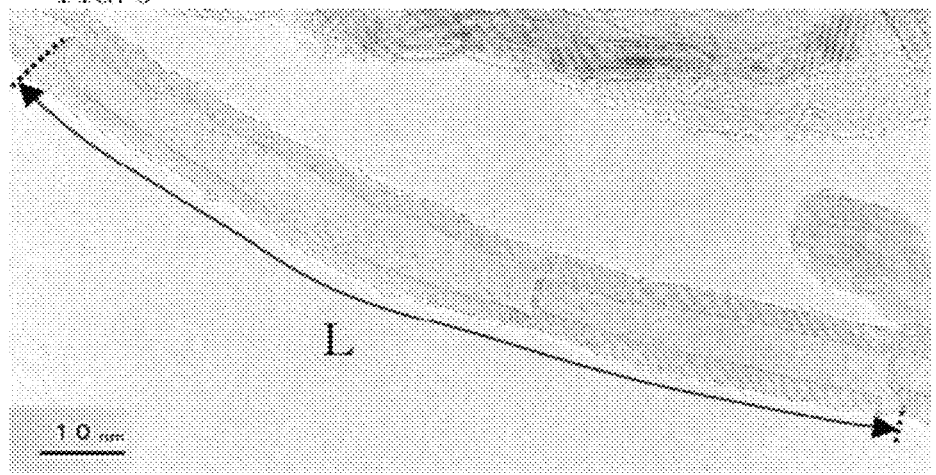
FIG. 3 is a TEM image of the fine carbon fiber produced in Production Example A1.
Figure 4:
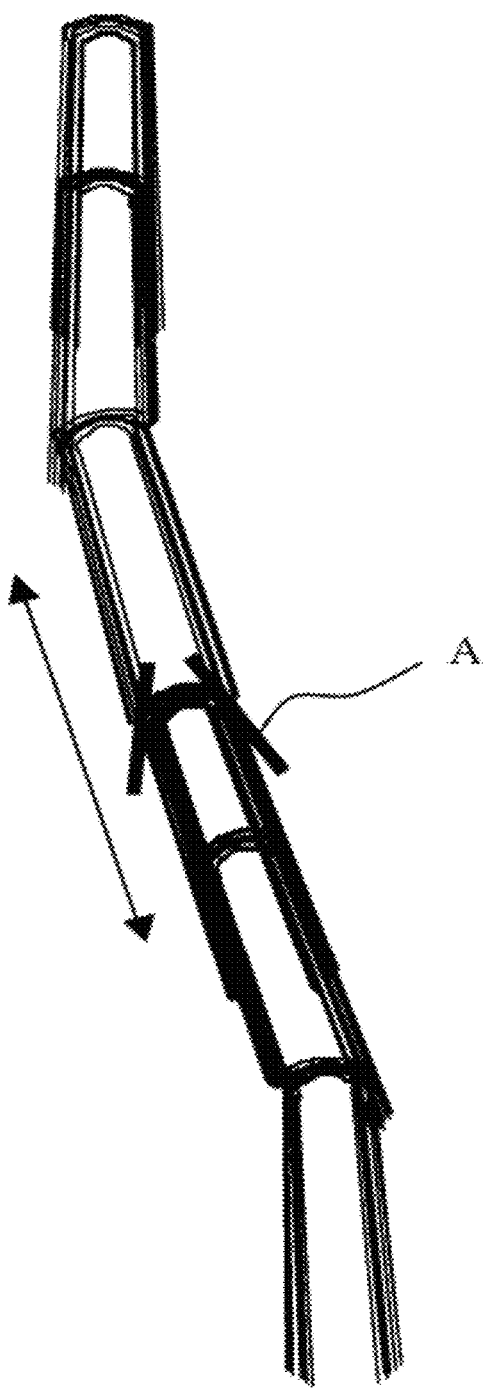
FIG. 4 is a schematic drawing showing that a fine carbon fiber is pulled out to form a fine short carbon fiber by shear stress.
Figure 5:
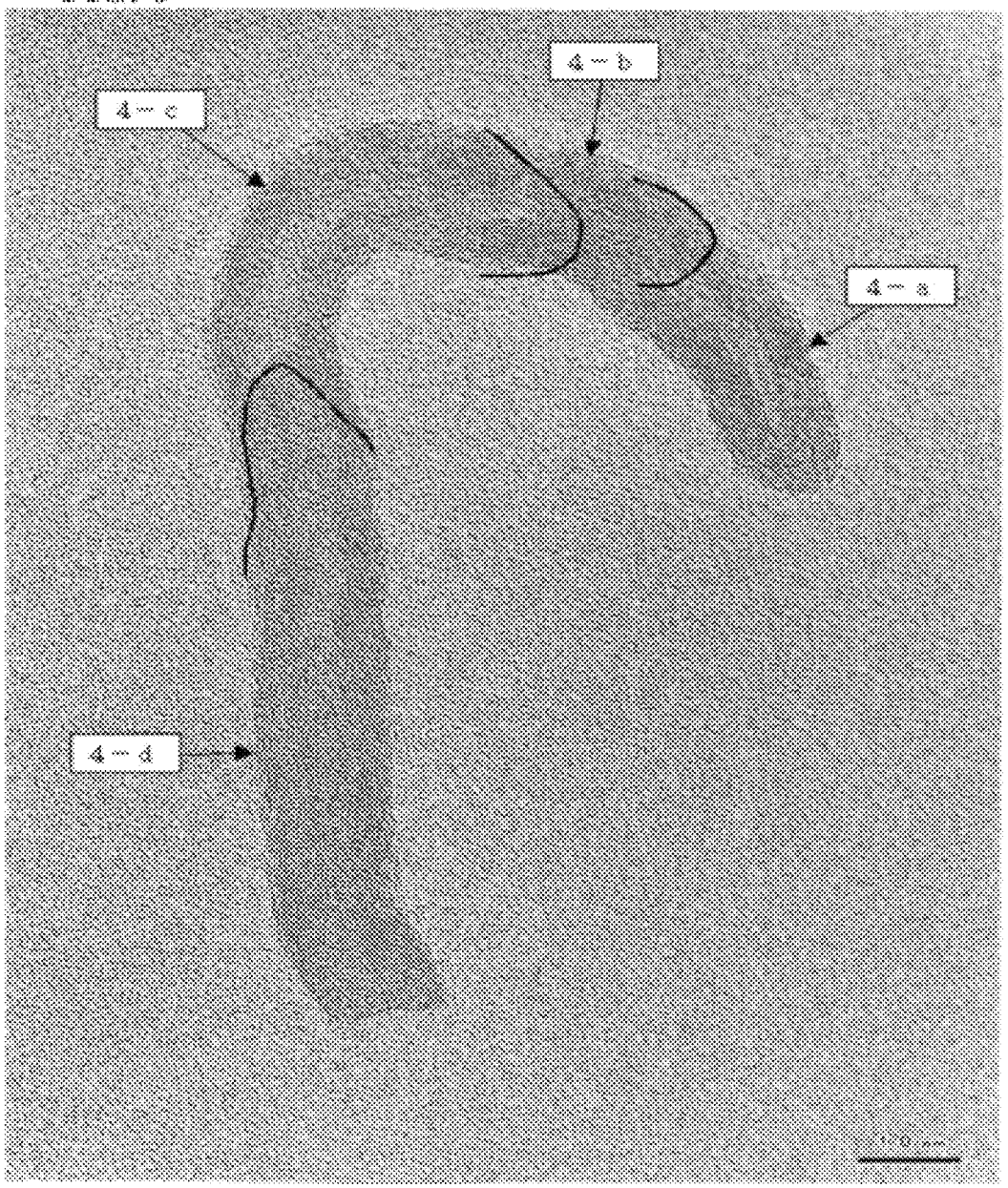
FIG. 5 is a TEM image of a fine carbon short fiber formed by shortening.

A fine carbon fiber and a fine short carbon fiber has a temple-bell-shaped structure as shown in FIG. 1(a) as a minimal structural unit. A temple bell is commonly found in Japanese temples, which has a relatively cylindrical-shaped body-part, which is different from a Christmas bell that is very close to cone-shape. As shown in FIG. 1(a), a structural unit 11 has a head-top part 12 and a body-part 13 having an open end like a temple bell and approximately has a shape as a body of rotation formed by rotation about a central axis. The structural unit 11 is constituted by a graphite-net plane consisting solely of carbon atoms, and the circumference of the open-end of the body-part is the open end of the graphite-net plane. Here, although the central axis and the body-part 13 are, for convenience, indicated by a straight line in FIG. 1(a), they are not necessarily straight, but may be curved as shown in FIGS. 3 and 5 described later.

The body-part 13 is gradually enlarged toward the open-end side, and as a result, the generatrix of the body-part 13 is slightly oblique to the central axis of the temple-bell-shaped structural unit and an angle formed θ by these is less than 15°, more preferably 1°<θ<15°, further preferably 2°<θ<10°. With an excessively large θ, a fine fiber constituting from the structural units has a structure like a fish bone carbon fiber, leading to deterioration in conductivity in a fiber axis direction. On the other hand, with a smaller θ, it has a structure like a cylindrical tube and thus the open end of the graphite-net plane constituting the body-part in the structural unit are less exposed in the outer circumference surface of the fiber, leading to deterioration in conductivity between adjacent fibers.

The fine carbon fiber and the fine short carbon fiber have defects and irregular disturbances, but when their shape is observed as a whole neglecting such irregularity, it can be the that they have a temple-bell-shaped structure where the body-part 13 is gradually enlarged toward the open end side. In terms of a fine short carbon fiber and a fine carbon fiber of the present invention, the above description does not mean that θ is within the above range in all parts, but means that when the structural unit 11 is observed as a whole neglecting defects and irregular parts, θ generally is within the above range. Therefore, in determination of θ, it is preferable to eliminate an area near the head-top part 12 where a thickness of the body-part irregularly varies. More specifically, for example, when a length of a temple-bell-shaped structural unit aggregate 21 (see, the description below) is "L" as shown in FIG. 1(b), θ may be measured at three points (¼)L, (½)L and (¾)L from the head-top part side and an average of the measured values is determined and the average may be regarded as θ for the whole structural unit 11. "L" is ideally measured in a straight line, but actually, the body-part 13 is often curved, and therefore, it can be measured along the curve in the body-part 13 to give a substantially more real value.

When produced as a fine carbon fiber (the same goes for a fine short carbon fiber), the head-top part has a shape which is smoothly connected to the body-part and convexly curved to the upper side (in the figure). A length of the head-top part is typically about "D" (see FIG. 1(b)) or less, sometimes about "d" (see FIG. 1(b)) or less, wherein "D" and "d" will be described for a temple-bell-shaped structural unit aggregate.

Furthermore, as described later, active nitrogen is not used as a starting material, so that other atoms such as nitrogen are not contained in the graphite-net plane of the temple-bell-shaped structural unit. Thus, the fiber exhibits excellent crystallinity.

In a fine carbon fiber and a fine short carbon fiber used in the present invention, as shown in FIG. 1(b), 2 to 30 of such temple-bell-shaped structural units are stacked sharing a central axis, to form a temple-bell-shaped structural unit aggregate 21 (hereinafter, sometimes simply referred to as an "aggregate"). The stack number is preferably 2 to 25, more preferably 2 to 15.

An outer diameter "D" of the body-part of the aggregate 21 is 5 to 40 nm, preferably 5 to 30 nm, further preferably 5 to 20 nm. A diameter of a fine fiber increases as "D" increases, so that in a composite with a polymer, a large amount needs to be added for giving particular functions such as conductivity. On the other hand, as "D" decreases, a diameter of a fine fiber decreases, so that fibers tend to more strongly agglomerate each other, leading to, for example, difficulty in dispersing them in preparation of a composite with a polymer. A body-part outer diameter "D" is determined preferably by measuring it at three points (¼)L, (½)L and (¾)L from the head-top part of the aggregate and calculating an average. Although FIG. 1(b) shows a body-part outer diameter "D" for convenience sake, an actual "D" is preferably an average of the measured values at the above three points.

An inner diameter "d" of the body-part of the aggregate is 3 to 30 nm, preferably 3 to 20 nm, further preferably 3 to 10 nm. Again, a body-part inner diameter "d" is determined preferably by measuring it at three points (¼)L, (½)L and (¾)L from the head-top part of the temple-bell-shaped structural unit aggregate and calculating an average. Although FIG. 1(b) shows a body-part inner diameter "d" for convenience sake, an actual "d" is preferably an average of the measured values at the above three points.

An aspect ratio (L/D) calculated from a length "L" of the aggregate 21 and a body-part outer diameter "D" is 2 to 150, preferably 2 to 30, more preferably 2 to 20, further preferably 2 to 10. With a larger aspect ratio, a fiber formed has a structure of a more cylindrical tube and conductivity in a fiber axis direction in a single fiber is improved, but the open ends of the graphite-net planes constituting the body-part of the structural units are less frequently exposed in the circumferential surface of the fiber, leading to deterioration in conductivity between adjacent fibers. On the other hand, with a smaller aspect ratio, the open ends of the graphite-net planes constituting the body-part of the structural units are more frequently exposed in the circumferential surface of the fiber, so that conductivity between adjacent fibers can be improved, but a fiber circumferential surface is constituted by a number of connected short graphite-net planes in a fiber axis direction, leading to deterioration in conductivity in a fiber axis direction in a single fiber.

The fine carbon fiber and the fine short carbon fiber share an essentially common configuration for a temple-bell-shaped structural unit and a temple-bell-shaped structural unit aggregate, but a fiber length is different as described below.

First, the fine carbon fiber is formed by connecting the aggregates in a head-to-tail style as shown in FIG. 2(a). A head-to-tail style means that in a configuration of the fine carbon fiber, a bonding site between adjacent aggregates is formed from a combination of the head-top part (head) of one aggregate and the lower end (tail) of the other aggregate. As a specific style of bonding the part, the head-top part of the outermost temple-bell-shaped structural unit in the second aggregate 21b is inserted into the inner part of the innermost temple-bell-shaped structural unit at a lower opening of a first aggregate 21a; and furthermore, the head-top part of a third aggregate 21c is inserted into the lower opening of a second aggregate 21b, and a number of such combinations are serially connected to form a fiber.

Each bonding part forming one fine fiber of the fine carbon fibers does not have structural regularity; for example, a length of a bonding part between a first aggregate and a second aggregate in a fiber axis direction is not necessarily equal to a length of a bonding part between the second aggregate and a third aggregate. Furthermore, as shown in FIG. 2(a), two aggregates bonded share a common central axis and may be connected in a straight line, but as in the temple-bell-shaped structural unit aggregates 21b and 21c shown in FIG. 2(b), they may be bonded without sharing a central axis, resulting in a curved structure in the bonding part. A length "L" of the temple-bell-shaped structural unit aggregate is approximately constant in each fiber. However, since in vapor phase growth, starting materials and byproduct gaseous components and a catalyst and a solid product component exist in mixture, a temperature distribution may occur in a reaction vessel; for example, a local site at a temporarily higher temperature generates depending on a flowing state of the above heterogeneous reaction mixture of a gas and a solid during an exothermic carbon precipitating reaction, possibly resulting in variation in a length "L" to some extent.

In the fine carbon fiber thus constituted, at least some of the open ends of the graphite-net planes in the lower end of the temple-bell-shaped structural units are exposed in the fiber circumferential surface, depending on a connection distance of the aggregates. Consequently, without conductivity in a fiber axis direction in a single fiber being deteriorated, conductivity between adjacent fibers can be improved due to jumping effect by π-electron emission (tunnel effect) as described above. Such a fine carbon fiber structure can be observed by a TEM image. Furthermore, it can be believed that the effects of a fine carbon fiber are little affected by curving of the aggregate itself or curving of the connection part of the aggregates. Therefore, parameters associated with a structure can be determined by observing an aggregate having a relatively straight part in a TEM image, as the structural parameters (θ, D, d, L) for the fiber.

Next, a fine short carbon fiber is prepared by further shortening the fine carbon fiber thus formed. Specifically, shear stress is applied to the fine carbon fiber, to cause sliding between graphite fundamental planes in the aggregate bonding part, so that the fine carbon fiber is shortened at some of the bonding parts of the aggregates to give a shorter fiber. The fine short carbon fiber formed by such fiber shortening is as short as a fiber length of 1 to about several ten aggregates (that is, 100 or less, up to about 80, preferably up to about 70), preferably one to 20 aggregates which are connected. An aspect ratio of the aggregates in this fine short carbon fiber is about 2 to 150. An aspect ratio of the aggregates in the fine short carbon fiber which is suitable for mixing is 2 to 50. Even when shear stress is applied, cleavage does not occur in a fiber straight body-part of the fiber consisting of carbon SP2 bonds in the aggregate, so that the fiber cannot be cut into a unit smaller than an aggregate.

Also in the fine short carbon fiber, since the end surface of the graphite net is exposed, conductivity between adjacent fibers is as high as a fine carbon fiber before fiber shortening due to jumping effect by π-electron emission (tunnel effect) as described above while conductivity in a fiber axis in a single fiber is not deteriorated. A structure of a fine short carbon fiber after fiber shortening as described above can be observed by a TEM image. Furthermore, it can be believed that the effects of the fine short carbon fiber are little affected by curving of the aggregate itself or curving of the bonding part of the aggregates. In the fine short carbon fiber in FIG. 5, four temple-bell-shaped structural unit aggregates of 4-a to 4-d are connected as shown in the figure, and for each, θ and an aspect ratio (L/D) are 4-a: θ=4.8°, (L/D)=2.5; 4-b: θ=0.5°, (L/D)=2.0; 4-c: θ=4.5°, (L/D)=5.0; 4-d: θ=1.1°, (L/D)=5.5.

In XRD by Gakushin-method of a fine carbon fiber and a short carbon fiber, a peak half width W (unit: degree) of 002 plane measured is within the range of 2 to 4. If W is more than 4, graphite exhibits poor crystallinity and poor conductivity. On the other hand, if W is less than 2, graphite exhibits good crystallinity, but at the same time, fiber diameter becomes large, so that a larger amount is required for giving functions such as conductivity to a polymer.

A graphite plane gap d002 as determined by XRD using Gakushin-method of a fine carbon fiber and a short carbon fiber is 0.350 nm or less, preferably 0.341 to 0.348 nm. If d002 is more than 0.350 nm, graphite crystallinity is deteriorated and conductivity is reduced. On the other hand, a fiber of 0.341 nm is produced in a low yield in the production.

The ash content contained in the fine carbon fiber and the short carbon fiber is 4% by weight or less, and therefore, purification is not necessary for a common application. Generally, it is 0.3% by weight or more and 4% by weight or less, more preferably 0.3% by weight or more and 3% by weight or less. The ash content is determined from a weight of an oxide as a residue after combustion of 0.1 g or more of a fiber.

A fine short carbon fiber has a fiber length of preferably 100 to 1000 nm, more preferably 100 to 300 nm. A fine short carbon fiber having such a length in which a peak half width W (unit: degree) of the above 002 plane is 2 to 4 and a graphite plane gap d002 is 0.350 nm or less, preferably 0.341 to 0.348 nm is a novel fiber which is not known in the prior art.

As mentioned above, fine carbon fibers contained in a composition of the present invention are electroconductive carbon fibers which do not belong to any of three categories (1) to (3). It is possible that a temple-bell-shaped body slightly inclined outward is responsible for electron flow in a longitudinal direction of the fiber itself while electron emission from the open end of the temple-bell-shaped body is responsible for inter-fiber electron flow. This probably contributes to improvement an electroconductivity performance in the resin composition of the present invention.

There will be described a process for manufacturing a fine carbon fiber and a fine short carbon fiber. A fine short carbon fiber is produced by shortening a fine carbon fiber.

Process for Manufacturing a Fine Carbon Fiber

First, a process for manufacturing a fine carbon fiber is as follows. The fine carbon fiber is produced by vapor phase growth using a catalyst. Preferred catalyst comprises an element selected from the group consisting of Fe, Co, Ni, Al, Mg and Si, and the preferred feed gas is a mixed gas containing CO and $H_2$. Most preferably, using a catalyst which is an oxide of cobalt having a spinel type crystal structure containing magnesium by substitution forming solid solution, vapor phase growth is conducted supplying a mixed gas containing CO and $H_2$ to the catalyst particles to produce a fine carbon fiber.

A spinel type crystal structure of cobalt where Mg is substituted forming solid solution is represented by $Mg_xCo_{3-x}O_y$. In this formula, x is a number indicating substitution of Co by Mg, and nominally, 0<x<3. Furthermore, y is a number selected such that electric charge of the whole formula becomes neutral, and is formally a number of 4 or less. That is, a spinel-type oxide of cobalt $Co_3O_4$ contains divalent and trivalent Co ions, and when divalent and trivalent cobalt ions are represented by $Co^{II}$ and $Co^{III}$, respectively, a cobalt oxide having a spinel type crystal structure is represented by $Co^{II}Co^{III}_2O_4$. Both sites of $Co^{II}$ and $Co^{III}$ are substituted by Mg to form a solid solution. After the solid solution formation by substitution with Mg for $Co^{III}$, electric charge is kept to be neutral and thus y is less than 4. However, both x and y have a value within a range that a spinel type crystal structure can be maintained.

For the use as a catalyst, a solid solution range of Mg represented by x is preferably 0.5 to 1.5, more preferably 0.7 to 1.5. A solid solution amount as x of less than 0.5 results in poor catalyst activity, leading to production of a fine carbon fiber in a lower yield. If x is more than 1.5, it is difficult to produce a spinel type crystal structure.

A spinel-type oxide crystal structure of the catalyst can be confirmed by XRD, and a crystal lattice constant "a" (cubic system) is within the range of 0.811 to 0.818 nm, more preferably 0.812 to 0.818 nm. If "a" is small, substitutional solid solution formation with Mg is inadequate and catalyst activity is low. The above spinel-type oxide crystal having a lattice constant larger than 0.818 nm is difficult to produce.

We suppose that such a catalyst is suitable because solid solution formation by substitution with magnesium in the spinel structure oxide of cobalt provides a crystal structure as if cobalt is dispersedly placed in magnesium matrix, so that under the reaction conditions, aggregation of cobalt is inhibited.

A particle size of the catalyst can be selected as appropriate and for example, is 0.1 to 100 µm, preferably 0.1 to 10 µm as a median diameter.

Catalyst particles are generally placed on an appropriate support such as a substrate or a catalyst bed by an appropriate application method such as spraying, for use. Spraying catalyst particles on a substrate or catalyst bed can be conducted by directly spraying the catalyst particles or spraying a suspension of the particles in a solvent such as ethanol and then drying it to spray a desired amount.

It is also preferable that catalyst particles are activated before being reacted with a source gas. Activation is generally conducted by heating under a gas atmosphere containing $H_2$ or CO. Such activation can be conducted by diluting the above gas with an inert gas such as He and $N_2$ as necessary. A temperature at which activation is conducted is preferably 400 to 600° C., more preferably 450 to 550° C.

There are no particular restrictions to a reactor for vapor phase growth, which can be conducted using a reactor such as a fixed-bed reactor and a fluidized-bed reactor.

A mixed gas containing CO and $H_2$ is used as a source gas to be a carbon source in vapor-phase growth.

An addition concentration of $H_2$ gas $\{(H_2/(H_2+CO)\}$ is preferably 0.1 to 30 vol %, more preferably 2 to 20 vol %. When the addition concentration is too low, cylindrical graphite net planes form a carbon-nanotube-like structure parallel to a fiber axis. On the other hand, if it is more than 30 vol %, the angle of the temple-bell-shaped structure oblique to the fiber axis of a carbon side peripheral surface becomes larger and similar to a fish-bone shape, leading to lower electroconductivity in a fiber direction.

The source gas can contain an inert gas. Examples of such an inert gas include $CO_2$, $N_2$, He and Ar. The inert gas is preferably contained in such an amount that it does not significantly reduce a reaction rate; for example, 80 vol % or less, preferably 50 vol % or less. Furthermore, a synthetic gas containing $H_2$ and CO or a waste gas such as a steel converter exhaust gas can be, as necessary, used after appropriate treatment.

A reaction temperature for conducting vapor-phase growth is preferably 400 to 650° C., more preferably 500 to 600° C. If a reaction temperature is too low, a fiber does not grow. On the other hand, if a reaction temperature is too high, an yield is reduced. A reaction time is, but not limited to, for example, 2 hours or more and about 12 hours or less.

In terms of a reaction pressure, vapor-phase growth can be conducted at an ambient pressure from the viewpoint of convenience of a reactor or operation, but as long as carbon growth of Boudouard equilibrium proceeds, the reaction can be conducted under the pressurized or reduced-pressure condition.

It has been demonstrated that according to this manufacturing process for a fine carbon fiber, an yield of a fine carbon fiber per a unit weight of the catalyst is considerably higher than that in a conventional manufacturing process. An yield of a fine carbon fiber according to this manufacturing process for a fine carbon fiber is 40 folds or more, for example 40 to 200 folds per a unit weight of the catalyst. As a result, a fine carbon fiber containing reduced amount of impurities and ash content as described above can be produced.

Although a process of forming the bonding part unique to the fine carbon fiber prepared by this manufacturing process for a fine carbon fiber is not clearly understood, it is speculated that balance between exothermic Boudouard equilibrium and heat removal by source-gas flowing causes variation of a temperature near the fine cobalt particles formed from the catalyst, so that carbon growth intermittently proceeds, resulting in formation of the bonding part. In other words, it is speculated that four processes: [1] formation of a head-top part of a temple-bell-shaped structure, [2] growth of a body-part in the temple-bell-shaped structure, [3] pause of growth due to temperature increase caused by the processes [1] and [2], and [4] cooling by a flowing gas, are repeated on fine catalyst particles, to form the bonding part unique to a fine carbon fiber structure.

Manufacturing Process for a Fine Short Carbon Fiber

As described above, a fine carbon fiber can be produced. Next, a fine short carbon fiber can be produced by separating a fine carbon fiber to shorten it. Preferably, it is prepared by applying shear stress to the fine carbon fiber. Suitable examples of a specific fiber shortening method include those using a grinder, a tumbling ball mill, a centrifugal ball mill, a centrifugal planetary ball mill, a bead mill, a microbead mill, an attriter type high-speed ball mill, a rotating rod mill, a vibrating rod mill, a roll mill and a three-roll mill. The fiber shortening of the fine carbon fiber may be conducted in wet-process or dry-process. Wet fiber shortening may be conducted in the presence of either a resin or a resin and a filler. Since fine carbon fibers before fiber shortening aggregate like a fluff ball, the presence of a small medium capable of loosening such a ball can accelerate shredding and fiber shortening. Furthermore, coexistence of a fine filler allows for shortening of the fine carbon fiber and mixing and dispersing the filler can be conducted at the same time. An atmosphere in dry fiber shortening can be selected from an inert atmosphere or an oxidative atmosphere, depending on a purpose.

The reason why the fine carbon fiber can be easily shortened by applying shear stress is due to the structure of the fine carbon fiber. Specifically, it is because a fine carbon fiber is formed from temple-bell-shaped structural unit aggregates connected in a head-to-tail style with a distance. When shear stress is applied to the fiber, the fiber is pulled to the fiber axis direction indicated by an arrow in FIG. 4, and then sliding occurs between carbon fundamental planes constituting a bonding part (in FIG. 4, see region A: "two sticks" shape which is Japanese katakana "ha"), and one to several ten temple-bell-shaped structural unit aggregates are pulled off at the head-to-tail bonding parts, resulting in fiber shortening. That is, the head-to-tail bonding part is not formed by consecutive carbon double bonds in a fiber axis direction like a concentric fine carbon fiber, but formed by bonds mainly via van der Waals force with a lower bond energy. When crystallinity is compared between a fine carbon fiber and a fine short carbon fiber prepared by shortening the above fine carbon fiber on the basis of a carbon layer gap and a true specific gravity, difference is not observed in carbon crystallinity between these. However, in comparison with the fine carbon fiber, the fine short carbon fiber after fiber shortening has a larger surface area by about 2 to 5%. Increase of a surface area to this extent would be due to fiber shortening, indicating that shortening of a fine carbon fiber is caused by the pulling-off of the temple-bell-shaped structural unit aggregates simply from their bonding sites, while carbon crystallinity of the temple-bell-shaped structural unit aggregates in the fine carbon fiber is not deteriorated.

<<Resin Component>>

<Polyamide Resin>

It is preferred that the polyamide resin to be employed in the present invention comprises the polyamide resin obtained from the dicarboxylic acid component comprising oxalic acid and the diamine component comprising a diamine having 4 to 12 carbon atoms.

The electroconductive polyamide resin composition of the present invention may also comprise polyamides such as an aliphatic polyamide and an aromatic polyamide in addition to the polyamide resin described above within a range which does not deteriorate the effects of the present invention. The preferred polyamides to be mixed include an aliphatic polyamide such as nylon 6, nylon 66, nylon 12 and nylon 11 and a copolymer thereof, and an aromatic polyamide such as nylon 66/6T, nylon 6T/6I and nylon MXD6 and a copolymer thereof.

<Characteristics and Physical Properties of Polyamide Resin>

Although there is no particular restriction on a molecular weight of the polyamide resin to be employed in the present invention, its relative viscosity $\eta r$ (measured at 25° C. by employing a solution with a polyamide resin concentration of 1.0 g/dl in 96% conc. sulfuric acid as a solvent) is preferably within a range of 1.8 to 6.0, more preferably 2.0 to 5.5 and particularly preferably 2.5 to 4.5. If $\eta r$ is too low, a molded article becomes brittle and its properties degrade. If on the other hand $\eta r$ is too high, a melt viscosity becomes high and a molding processability becomes impaired.

Then, the following explanations are given to the dicarboxylic acid component and the diamine component to be employed for producing the polyamide resin to be employed in the present invention.

<Dicarboxylic Acid Component>

In the present invention, it is preferred that the dicarboxylic acid component to be employed for producing the polyamide resin comprises oxalic acid.

In producing the polyamide resin of the present invention, it is preferred that an oxalate diester is employed as a source of oxalic acid. There is no particular restriction on the oxalate diester so long as it has a reactivity with an amino group, which includes an oxalate diester of an aliphatic monohydric alcohol such as dimethyl oxalate, diethyl oxalate, di-n-(or i-)propyl oxalate and di-n-(or i- or t-)butyl oxalate, an oxalate diester of an alicyclic alcohol such as dicyclohexyl oxalate, and an oxalate diester of an aromatic alcohol such as diphenyl oxalate.

Among the oxalate diesters described above, the oxalate diester of an aliphatic monohydric alcohol having carbon atoms more than 3, the oxalate diester of an alicyclic alcohol and the oxalate diester of an aromatic alcohol are preferable, and dibutyl oxalate and diphenyl oxalate are particularly preferable.

As a dicarboxylic acid component other than oxalic acid, an aliphatic dicarboxylic acid such as malonic acid, succinic acid, glutaric acid, adipic acid and sebacic acid, an alicyclic dicarboxylic acid such as 1,4-cyclohexanedicarboxylic acid, and furthermore an aromatic dicarboxylic acid such as terephthalic acid, isophthalic acid, 2,6-naphthalenedicarboxylic acid and benzenedicarboxylic acid may be used in addition to oxalic acid solely or by mixing two or more within a range which does not deteriorate the effects of the present invention.

It is preferred that oxalic acid is comprised not less than 80% by mole, further preferably is comprised not less than 90% by mole and particularly preferably is comprised not less than 95% by mole, and also preferably 100% by mole relative to the total amount of the dicarboxylic acid component.

<Diamine Component>

In the present invention, as the diamine component to be employed for producing the polyamide resin, an aliphatic diamine, an alicyclic diamine and an aromatic diamine having 4 to 12 carbon atoms are preferable, and nonanediamine, decanediamine and dodecanediamine and an isomer thereof are more preferable. These may be employed solely or by mixing two or more.

When two or more diamines are mixed to be employed, for example, the mixture of 1,9-nonanediamine and 2-methyl-1,8-octanediamine may be employed, in which a molar ratio of 1,9-nonanediamine and 2-methyl-1,8-octanediamine is 1:99 to 99:1, preferably 5:95 to 40:60 or 60:40 to 95:5, particularly preferably 5:95 to 30:70 or 70:30 to 90:10.

As necessary may also be further employed another diamine except the diamines described above. It is preferred that the diamine having 4 to 12 carbon atoms is comprised not less than 80% by mole, further preferably is comprised not less than 90% by mole and particularly preferably is comprised not less than 95% by mole, and also preferably 100% by mole relative to the total amount of the diamine component.

<Method for Producing the Polyamide Resin>

The polyamide resin of the present invention can be produced employing an arbitrary method known as a method for producing a polyamide. In accordance with studies by the present inventors, the polyamide resin can be obtained by polycondensation reacting the diamine and a dicarboxylate ester comprising the oxalate diester described above in a batch system or a continuous system. Specifically, as illustrated in the following operations, the production is preferably performed in the order of (i) a pre-polycondensation step and (ii) a post-polycondensation step.

(i) Pre-Polycondensation Step:

After initially replacing the inside of a reactor with nitrogen and the like, a diamine and a dicarboxylate ester comprising an oxalate diester (oxalic acid source) are mixed. Although there is no particular restriction on a reactor so long as it has an endurance for a temperature and pressure at a polycondensation reaction to be carried out later, it is desired to employ a vessel equipped with an apparatus to distil away and condense an alcohol when a mixing temperature is equal to or higher than a boiling point of an alcohol resultant from a condensation reaction. It is also preferred to employ a pressure tight vessel in case of a pressurized polymerization in the presence of an alcohol resultant from a condensation reaction.

A charging ratio (molar ratio) of an oxalate diester and a diamine is an oxalate diester/diamine of 0.8 to 1.5, preferably 0.9 to 1.1 and further preferably 0.99 to 1.01. When for example, the mixture of 1,9-nonanediamine and 2-methyl-1,8-octanediamine (a molar ratio of 1,9-nonanediamine and 2-methyl-1,8-octanediamine is from 1:99 to 99:1) is employed as a diamine component, a charging ratio of an oxalate diester and a diamine is also an oxalate diester/the above-described diamine of 0.8 to 1.2 (molar ratio), preferably 0.91 to 1.09 (molar ratio) and further preferably 0.98 to 1.02 (molar ratio).

A temperature for mixing feedstocks is not particularly restricted so long as the temperature is equal to or higher than a melting point and lower than a boiling point of feedstocks such as the dicarboxylate ester comprising the oxalate diester and the diamine, and so that a polyoxamide resultant from the polycondensation reaction of the oxalate diester and the diamine is not thermally decomposed.

When for example, the polyoxamide resin is produced by employing as a diamine component a mixture of 1,9-nonanediamine and 2-methyl-1,8-octanediamine (a molar ratio of 1,9-nonanediamine and 2-methyl-1,8-octanediamine is from 1:99 to 99:1), and by employing dibutyl oxalate as an oxalic acid source, it is preferred that the mixing temperature described above is from 15° C. to 240° C. When a molar ratio of 1,9-nonanediamine and 2-methyl-1,8-octanediamine is from 5:95 to 90:10, room temperature to ca. 40° C. is more preferable because the mixture is liquefied and it is easy to use.

Upon mixing, a solvent in which both the diamine and the dicarboxylate ester are soluble may be employed. Although for example, the solvent in which both the diamine component and the oxalic acid source are soluble is not particularly restricted, may be employed toluene, xylene, trichlorobenzene, phenol, trifluoroethanol and the like, and in particular toluene is preferably employed. After for example, a toluene solution having dissolved the diamine is heated (for example, heated up to 50° C.), and the dicarboxylate ester may be added thereto.

The temperature is raised under atmospheric pressure with stirring and/or nitrogen bubbling the inside of a reactor charged in this manner. The temperature is preferably raised up to 80 to 150° C. and more preferably 100 to 140° C. to conduct the reaction.

(ii) Post-Polycondensation Step:

In an attempt further to achieve a high molecular weight, a polymerized product resultant in the pre-polycondensation step described above is subjected to gradual temperature rise in the reactor under atmospheric pressure. It is preferred that the temperature is finally raised to a temperature equal to or higher than a melting point of the polyoxamide resin to be produced and the like and where they are not thermally decomposed. In the rising temperature process, the rising temperature is initiated at the final achieving temperature in the pre-polycondensation step described above, that is to say preferably 80 to 150° C., and is finally achieved to a temperature range not less than 220° C. and not more than 300° C., preferably not less than 230° C. and not more than 280° C., further preferably not less than 240° C. and not more than 270° C. It is preferred to conduct the reaction for 1 to 8 hours, preferably 2 to 6 hours, including the temperature rising time.

When for example, the polyoxamide resin is produced from, as a feedstock, the diamine consisting of 1,9-nonanediamine and 2-methyl-1,8-octanediamine with a molar ratio of 1,9-nonanediamine and 2-methyl-1,8-octanediamine being 85:15 and dibutyl oxalate, it is preferred that the temperature is raised up to 240° C. to 280° C. (a pressure is from 2 MPa to 4 MPa) because its melting point is 235° C.

As necessary, a polymerization may also be conducted under reduced pressure in the post-polycondensation step. In the case of performing the polymerization under reduced pressure, the final achieving pressure preferred is from 0.1 MPa to 13.3 MPa.

It is preferred to conduct continuously the polycondensation reaction while distilling away a resultant alcohol under nitrogen flow with an ordinary pressure or under reduced pressure as necessary. It is also preferred to cool down and condense the alcohol with a water cooled condenser to collect it.

<Resin Components Other than Polyamide>

Into the electroconductive polyamide resin composition of the present invention, a thermoplastic resin other than polyamide, an elastomer, a biodegradable plastic and the like may be mixed, which may be employed solely or by mixing two or more.

A preferred thermoplastic resin to be mixed includes, for example, a polyolefin-based resin (polyethylene, polypropylene, ethylene-vinyl acetate copolymer resin, ethylene-vinyl copolymer resin, ethylene-ethyl acrylate copolymer resin, ionomer and the like), a polyvinyl-based resin (polyvinyl chloride, styrene, ABS resin and the like), a polyester-based resin (polyethylene terephthalate, polybutylene terephthalate, polyethylene naphthalate, polycarbonate, liquid crystal polymer and the like), a polyether-based resin (polyoxymethylene, polyphenylene ether, aromaticpolysulfone, polyether ketones, polyphenylene sulfide, polyether imide and the like), and a fluoric resin (polytetrafluoroethylene, polyvinylidene fluoride and the like).

<Additional Component>

An additional component may also be used in combination with the electroconductive polyamide resin composition of the present invention in order to more effectively exhibit intended functions. Such additional component includes various pigments, a heat resistance agent such as a copper compound, various additives such as an ultraviolet absorber, a light stabilizer, an antioxidant, a flame retardant, a crystallization accelerator, a plasticizer and a lubricant, a filler and the like.

A pigment includes an extender pigment (a transparency white pigment such as barium sulfate, calcium carbonate, silica and aluminum oxide), a black pigment (carbon black, magnetite and the like), a white pigment (titanium dioxide, zinc oxide, tin dioxide, zirconium oxide and the like), a black and colored pigment (cobalt blue, titan yellow and the like).

A filler includes an electroconductive filler {metal-based (silver, copper, nickel, stainless fiber and the like), oxide-based filler (ZnO, ITO, ATO, nitride, carbide, boride), carbon, organic-based}, a magnetism filler (ferrite, Sm/Co, Nd/Fe/B and the like), a piezoelectricity filler, a thermal conductive filler (Ag, h-BN, AlN, $Al_2O_3$), a reinforcement filler (a glass fiber, a carbon fiber, MOS, talc, mica and the like), a molding processable filler, an impact resistance filler, an abrasion resistance filler, a heat resistance filler (clay mineral, talc, calcium carbonate, settleability barium sulfate and the like), a flame retardant filler (zinc borate, red phosphorus, ammonium phosphate, magnesium hydroxide and the like), a sound insulation/vibration proofed filler (iron powder, barium sulfate, mica, ferrite and the like), a solid lubricant filler (graphite, molybdenum disulfide, fluoric resin powder, talc and the like), a heat radiation filler (hydrotalcite, aluminum oxide, charcoal, magnesium oxide and the like) and the like.

A form of the filler may also be a granular form, a spherical form (improvement of an easily processability and a fracture toughness), a flat form (a flaky form) (a stiffness, a vibration damping, a surface lubricity), a needle form (a mechanical/thermal reinforcement, an electroconductive efficiency, a vibration damping), which can be utilized depending on a purpose. These additional components may be arbitrarily added in accordance with an intended use of the electroconductive polyamide resin composition. Typically, the additional component is added within a range of 2% by mass to 40% by mass of the total mass of the electroconductive polyamide resin composition.

While a preferred reinforcement filler is a glass fiber and a carbon fiber, blending with a glass fiber particularly makes an effect considerable on the improvement of physical properties such as a strength and a creep resistance for the electroconductive polyamide resin composition of the present invention. Although neither the glass fiber is particularly limited nor its glass fiber diameter is limited, 5 to 15 μm is preferable. Although regarding a fiber length, it may be a short fiber or otherwise a long fiber depending on an application, 5 to 1000 μm is preferable.

A blending proportion of a glass fiber is preferably 3 to 50% by mass and more preferably 5 to 35% by mass relative to the total mass of the polyamide resin composition. An improvement effect on a strength and a creep resistance is small if the blending proportion of the glass fiber is low, while a molding processability and a surface smoothness may be worsen if a blending amount of the glass fiber becomes high.

<<Molding of the Electroconductive Polyamide Resin Composition>>

A method for molding the electroconductive polyamide resin composition of the present invention and a form of a molded article are not particularly limited. As a molding method, various methods such as melt spinning, extrusion molding, blow molding, injection molding and press molding may be utilized, which is arbitrarily selected depending on a form of a molded article and a composition. A form of a molded article includes a film, a sheet, a filament, a rod, a tube, a belt, three-dimensional molded articles and the like.

An electroconductive mold-processed article obtained from the electroconductive polyamide resin composition of the present invention can be used in a broad range of applications such as an electric/electronic field, an automotive field, a civil engineering/building construction field, a medical field, an information/communication field and household products. In particular, the automotive field includes applications such as an admission part such as an air intake manifold and an air cleaner in an engine compartment, an engine and engine cooling system part such as an oil pump, an oil cooler, an oil pan, a radiator, a water pump and an impeller, a fuel system part such as a fuel pump, a fuel tank and peripherals thereof, a fuel tank valve, a fuel tube and a fuel tube connector, gears employed in a transmission and steering unit and other transmission parts, a brake and clutch part, and furthermore an electrostatic coating member such as an electromagnetic wave shielding member, an antistatic member and an automotive body panel.

The article is also useful for applications such as an electrode and an electrode electroconductive binder of a nonaqueous solvent-based electrical charge storage device such as a battery for consumer appliances and an automobile, a capacitor and an electrochemical capacitor, a current collector, an electromagnetic wave shielding member, an antistatic part and the like in other electric/electronic fields, and furthermore a tray in a production of an semiconductor device and its transfer process, a packaging material, a building material for a clean room, a dust-free garment and also an electronic equipment electroconductive member (such as a belt, a sleeve, a roll, a connector, a gear and a tube).

EXAMPLES

The following explanations are given to working examples together with comparative examples; however, the present invention is not limited thereby in any way. Measurements in the examples were performed by the following methods.

(1) Relative Viscosity ($\eta r$):

$\eta r$ was measured at 25° C. by employing the Ostwald's viscometer using a 96% sulfuric acid solution of polyamide (concentration: 1.0 g/dl).

(2) Water Absorption Percentage:

The polyamide resin pellets obtained in examples and comparative examples were let stand in an atmosphere with 65% Rh at 23° C., and a saturated water absorption percentage was measured by employing the Karl Fischer's moisture meter with reference to the JIS standards.

(3) Mechanical Physical Properties:

The measurements of [1] and [2] illustrated below were performed by employing a test specimen described below in which the test specimen was formed by injection molding at a resin temperature of 260° C. (230° C. in case of employing nylon 12) and a mold temperature of 80° C.

[1] Tensile test (Tensile strength at yield point): Measurement was made by employing an ISO Type A test specimen with reference to ISO 527-1, 2. The measurement was performed in an atmosphere with 50% Rh at 23° C.

[2] Bending test (Flexural modulus): Measurement was made by employing an ISO Type A test specimen with reference to ISO 178. The measurement was performed in an atmosphere with 50% Rh at 23° C.

(4) Volume Resistance Value:

A volume resistance value of a resin composition was measured with a low resistivity meter Loresta GP (MCP-T610) and a high resistivity meter Hiresta UP (MCP-HT450) (made by the DIA Instrument Co., Ltd.).

Production Example A1

Synthesis of Fine Carbon Fibers

Production Example A1

In 500 mL of ion-exchanged water were dissolved 115 g of cobalt nitrate [$Co(NO_3)_2 \cdot 6H_2O$: molecular weight 291.03] (0.40 mol) and 102 g of magnesium nitrate [$Mg(NO_3)_2 \cdot 6H_2O$: molecular weight 256.41] (0.40 mol), to prepare raw-material solution (1). Furthermore, 220 g of powdery ammonium bicarbonate [$(NH_4)HCO_3$: molecular weight 79.06] (2.78 mol) was dissolved in 1100 mL of ion-exchanged water, to prepare raw-material solution (2). Next, raw-material solutions (1) and (2) were mixed at a reaction temperature of 40° C., after which the mixture was stirred for 4 hours. The precipitate formed was filtered, washed and then dried.

The product was calcined and pulverized with a mortar to provide 43 g of a catalyst. A crystal lattice constant "a" (cubic system) of the spinel structure in this catalyst was 0.8162 nm, and a metallic element ratio in the spinel structure of the substitutional solid solution was Mg:Co=1.4:1.6.

A quartz reaction tube (inner diameter: 75 mmϕ, height: 650 mm) was perpendicularly fixed and in its center was placed a support of silica wool on which was then dispersed 0.9 g of the catalyst. Under He atmosphere, the tube was heated to a furnace temperature of 550° C., and then a mixed gas consisting of CO and $H_2$ (volume ratio: $CO/H_2$=95.1/4.9) as a source gas was fed from the bottom of the reaction tube at a flow rate of 1.28 L/min for 7 hours, to synthesize a fine carbon fiber.

An yield was 53.1 g, and an ash content was determined as 1.5% by weight. A peak half width "W" (degree) observed in XRD analysis of the product was 3.156 and d002 was 0.3437 nm. Furthermore, from a TEM image, parameters related to the dimensions of temple-bell-shaped structural units constituting the fine carbon fiber obtained and the aggregate of these were D=12 nm, d=7 nm, L=114 nm, L/D=9.5, θ=0 to 7° (average: about 3°). A stack number of the temple-bell-shaped structural units constituting the aggregate was 4 to 5.

Here, D, d and θ were determined for three points (¼)L, (½)L and (¾)L from the head-top of the aggregate.

FIG. 3 shows a TEM image of the fine carbon fiber prepared in Production Example A1.

A fine carbon fibers thus obtained was treated by a ceramic ball mill with a diameter of 2 mm for a predetermined time to prepare a fine short carbon fiber. FIG. 5 shows TEM images of a fine short carbon fiber after 20 hours. From the TEM images in FIG. 5, parameters related to the dimensions of temple-bell-shaped structural units constituting the fine short carbon fiber thus obtained and the aggregate of these were D=10.6 to 13.2 nm, L/D=2.0 to 5.5, θ=0.5° to 10°. Here, θ is an inclination average of the right and the left carbon layers to the center of the fiber axis in the TEM image. A stack number of the temple-bell-shaped structural units forming the aggregate was 10 to 20.

Production Examples B1 to B4

Production of the Polyamide Resin Employing Oxalic Acid as the Dicarboxylic Acid Component Production Example B1

28.40 kg (140.4 mol) of dibutyl oxalate was charged into a pressure tight vessel which was equipped with a stirrer, a thermometer, a torquemeter, a pressure gauge, a feedstock charging port to which a diaphragm pump was directly connected, a nitrogen gas inlet, a pressure vomitory, a pressure regulator and a polymer outlet, and which had an inner volume of 150 liters. After repeating 5 times an operation of pressuring the vessel inside by 0.5 MPa with a nitrogen gas having a purity of 99.9999% and then followed by releasing the nitrogen gas down to an ordinary pressure to perform a replacement with nitrogen, a temperature in the system was raised while stirring under a confined pressure. After a temperature of dibutyl oxalate was achieved up to 100° C. over 30 minutes, a mixture of 18.89 kg (119.3 mol) of 1,9-nonanediamine and 3.34 kg (21.1 mol) of 2-methyl-1,8-octanediamine (a molar ratio of 1,9-nonanediamine and 2-methyl-1,8-octanediamine being 85:15) was supplied into the reaction vessel over about 17 minutes at a flow rate of 1.49 liters/minute by the diaphragm pump, and at the same time the temperature was raised. In the immediate aftermath of the provision, the inside pressure in the pressure tight vessel rose up to 0.35 MPa due to butanol resultant from the polycondensation reaction, and the temperature of the polycondensation product rose up to 170° C. Thereafter, the temperature was raised up to 235° C. over 1 hour. In the meantime, the inside pressure was regulated at 0.5 MPa while the resultant butanol was drained from the pressure vomitory. Immediately after the temperature of the polycondensation product reached 235° C., butanol was drained from the pressure vomitory over about 20 minutes to let the inside pressure to be an ordinary pressure. Once the ordinary pressure was achieved, temperature rise was initiated while flowing a nitrogen gas at 1.5 liters/minute and the temperature of the polycondensation product was achieved to be 260° C. over about 1 hour to perform the reaction at 260° C. for 4.5 hours. Thereafter stirring was terminated and after the system inside was pressured by 1 MPa with nitrogen and left to stand for about 10 minutes, outgassing was made down to the inside pressure of 0.5 MPa and the polycondensation product was drained in form of a string from a draining outlet underneath the pressure tight vessel. The polycondensation product in form of a string was immediately cooled down with water, and the water-cooled resin in form of a string was pelletized by a pelletizer. The resultant polyamide was a white tough polymer and ηr=3.2.

Production Example B2

A polyamide was obtained by performing the reaction in a similar manner to the production example 1 except that the mixture of 11.11 kg (70.2 mol) of 1,9-nonanediamine and 11.11 kg (70.2 mol) of 2-methyl-1,8-octanediamine (a molar ratio of 1,9-nonanediamine and 2-methyl-1,8-octanediamine being 50:50) was charged. The resultant polyamide was a white tough polymer and ηr=3.35.

Production Example B3

A polyamide was obtained by performing the reaction in a similar manner to the production example 1 except that the mixture of 1.33 kg (8.4 mol) of 1,9-nonanediamine and 20.88 kg (131.9 mol) of 2-methyl-1,8-octanediamine (a molar ratio of 1,9-nonanediamine and 2-methyl-1,8-octanediamine being 6:94) was charged. The resultant polyamide was a white tough polymer and ηr=3.53.

Production Example B4

A polyamide was obtained by performing the reaction in a similar manner to the production example 1 except that the mixture of 1.33 kg (8.4 mol) of 1,9-nonanediamine and 20.88 kg (131.9 mol) of 2-methyl-1,8-octanediamine (a molar ratio of 1,9-nonanediamine and 2-methyl-1,8-octanediamine being 6:94) was charged, and that the inside pressure by draining butanol was kept at 0.25 MPa. The resultant polyamide was a white tough polymer and ηr=4.00.

Examples 1 to 5

After blending the polyamide resin produced in a similar manner to the production example B1 with a predetermined amount of the fine carbon fiber produced in a similar manner to the production example A1, and preliminarily mixing them by the Henschel mixer, the blend was melted and mixed at 260° C. by a double screw extruder, and the molten mixture was pelletized to obtain the electroconductive polyamide resin composition. This pellet was subjected to a melt press molding at 260° C. to measure its volume resistance value (Ω·cm) (applied voltage 10 V). The results are shown in Table 1 together with the blending compositions.

Comparative Example 1

An evaluation was made in a similar manner to the example 1 except that the Ketjen Black (EC600JD made by the Ketjen Black International Co.) was employed in place of the fine carbon fiber. The results are shown in Table 1 together with the blending compositions.

TABLE 1

|  | Unit | Ex. 1 | Ex. 2 | Ex. 3 | Ex. 4 | Ex. 5 | Comp. Ex. 1 |
| --- | --- | --- | --- | --- | --- | --- | --- |
| Polyamide used |  | B1 | B1 | B1 | B1 | B1 | B1 |
| Blending amount of the fine carbon fiber | % by mass | 6.0 | 1.5 | 3.0 | 8.0 | 13.0 |  |
| Blending amount of the Ketjen Black | % by mass |  |  |  |  |  | 6.0 |
| Volume resistance value | Ω·cm | $9 \times 10^1$ | $7 \times 10^7$ | $9 \times 10^1$ | $9 \times 10^0$ | $3 \times 10^0$ | $5 \times 10^4$ |
| Tensile strength Strength at yield point | MPa | 72 | 68 | 69 | 76 | 80 | 77 |
| Elongation at break | % | 16.2 | 27.3 | 21.8 | 13.9 | 7.3 | 4.8 |
| Flexural modulus | MPa | 2,900 | 2,600 | 2,700 | 3,100 | 3,900 | 3,000 |
| Charpy impact strength | KJ/m² | 3.4 | 3.6 | 3.6 | 3.0 | 2.8 | 1.5 |
| Water absorption percentage | % by mass | 0.3 | 0.3 | 0.3 | 0.3 | 0.3 | 0.3 |

As shown in Table 1, the examples 1 to 5 employing the fine carbon fiber characterizing the present invention more excel in the mechanical properties, in particular the tensile elongation at break and the impact strength than the comparative example 1 employing the Ketjen Black.

Example 6

An evaluation was made in a similar manner to the example 1 except that was employed the polyamide resin produced in a similar manner to the production example B2. The results are shown in Table 2.

Example 7

An evaluation was made in a similar manner to the example 1 except that was employed the polyamide resin produced in a similar manner to the production example B3. The results are shown in Table 2.

Example 8

An evaluation was made in a similar manner to the example 1 except that was employed the polyamide resin produced in a similar manner to the production example B4. The results are shown in Table 2.

Comparative Example 2

An evaluation was made in a similar manner to the example 1 except that was employed polyamide 6 (UBE nylon 1010X1 made by the UBE Industries, Ltd.: relative viscosity 2.00) in place of the polyamide resin wherein the dicarboxylic acid component is consisting of oxalic acid. The results are shown in Table 2.

Comparative Example 3

An evaluation was made in a similar manner to the example 1 except that was employed polyamide 12 (UBESTA 3012U made by the UBE Industries, Ltd.: relative viscosity 1.60) in place of the polyamide resin wherein the dicarboxylic acid component is consisting of oxalic acid. The results are shown in Table 2.

TABLE 2

|  |  | Unit | Ex. 6 | Ex. 7 | Ex. 8 | Comp. Ex. 2 | Comp. Ex. 3 |
|---|---|---|---|---|---|---|---|
| Polyamide used | | | B2 | B3 | B4 | 1010X1 | 3012U |
| Blending amount of the fine carbon fiber | | % by mass | 6.0 | 6.0 | 6.0 | 6.0 | 6.0 |
| Volume resistance value | | Ωcm | $1 \times 10^2$ | $3 \times 10^1$ | $5 \times 10^1$ | $6 \times 10^1$ | $7 \times 10^2$ |
| Tensile strength | Strength at yield point | MPa | 72 | 76 | 70 | 88 | 92 |
| | Elongation at break | % | 17.5 | 14.9 | 18.6 | 16.7 | 7.3 |
| Flexural modulus | | MPa | 3,000 | 3,100 | 3,100 | 3,400 | 3,900 |
| Charpy impact strength | | KJ/m² | 3.3 | 3.0 | 3.2 | 3.7 | 4.1 |
| Water absorption percentage | | % by mass | 0.3 | 0.3 | 0.3 | 2.8 | 0.9 |

As shown in Table 2, the examples 6 to 8 employing the polyamide consisting of oxalic acid as the dicarboxylic acid component characterizing the present invention more improve the water absorption percentage, which has been the defects of electroconductive resin compositions, than the comparative examples 2 and 3 employing the conventional aliphatic polyamide.

INDUSTRIAL USABILITY

The electroconductive polyamide resin composition of the present invention exhibits a high electroconductivity, a low water absorbability, an excellent chemical resistance and fuel resistance, while upholding the original property of a polyamide resin. Therefore, an electroconductive mold-processed article obtained from the polyamide resin composition of the present invention can be used in a broad range of applications such as an electric/electronic field, an automotive field, a civil engineering/building construction field, a medical field, an information/communication field and household products. In particular, the automotive field includes applications such as an admission part such as an air intake manifold and an air cleaner in an engine compartment, an engine and engine cooling system part such as an oil pump, an oil cooler, an oil pan, a radiator, a water pump and an impeller, a fuel system part such as a fuel pump, a fuel tank and peripherals thereof, a fuel tank valve, a fuel tube and a fuel tube connector, gears employed in a transmission and steering unit and other transmission parts, a brake and clutch part, and furthermore an electrostatic coating member such as an electromagnetic wave shielding member, an antistatic member and an automotive body panel. The composition is useful as an electromagnetic wave shielding member, an antistatic member and an electrostatic coating member in an electric/electronic field and an automotive field, and furthermore for applications such as a tray in a production of an semiconductor device and its transfer process, a packaging material, a building material for a clean room, a dust-free garment and also an electronic equipment electroconductive member (such as a belt, a sleeve, a roll, a connector, a gear and a tube).

DESCRIPTION OF SYMBOLS

11 structural unit
12 head-top part
13 body-part
21, 21a, 21b, 21c aggregate

The invention claimed is:

1. An electroconductive polyamide resin composition comprising:
    (a) a polyamide resin component obtained from a dicarboxylic acid component comprising oxalic acid and a diamine component comprising a diamine having 4 to 12 carbon atoms, and
    (b) a fine carbon fiber dispersed in the resin component, wherein a graphite-net plane consisting solely of carbon atoms forms a temple-bell-shaped structural unit comprising closed head-top part and body-part with open lower-end where an angle θ formed by a generatrix of the body-part and a fiber axis is less than 15°, 2 to 30 of the temple-bell-shaped structural units are stacked sharing a common central axis to form an aggregate having an aspect ratio L/D of 2 to 30 wherein D is an outer diameter of the body-part and L is a length of the aggregate, and the aggregates are connected in head-to-tail style with a distance by van der Waals forces to form the fine carbon fiber.

2. The electroconductive polyamide resin composition according to claim 1, wherein the fine carbon fiber is produced by vapor phase growth using a catalyst containing an element selected from the group consisting of Fe, Co, Ni, Al, Mg and Si, and an ash content in the fine carbon fiber is 4% by mass or less.

3. The electroconductive polyamide resin composition according to claim 1, wherein the fine carbon fiber is a fine short carbon fiber in which 100 or less of the aggregates are connected.

4. The electroconductive polyamide resin composition according to claim 3, wherein the fine short carbon fibers are produced by fiber shortening by applying shear stress.

5. An electroconductive polyamide resin composition according claim 1, wherein the diamine component of the polyamide resin is consisting of 1,9-nonanediamine and 2-methyl-1,8-octanediamine, and wherein a molar ratio of 1,9-nonanediamine and 2-methyl-1,8-octanediamine is 1:99 to 99:1.

* * * * *